United States Patent
Hagerman et al.

(10) Patent No.: US 9,408,222 B2
(45) Date of Patent: Aug. 2, 2016

(54) METHOD AND ARRANGEMENT FOR INTERFERENCE MITIGATION

(71) Applicant: TELEFONAKTIEBOLAGET L M ERICSSON (PUBL), Stockholm (SE)

(72) Inventors: Bo Hagerman, Tyresö (SE); Fredrik Gunnarsson, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/576,553

(22) Filed: Dec. 19, 2014

(65) Prior Publication Data

US 2015/0105091 A1 Apr. 16, 2015

Related U.S. Application Data

(62) Division of application No. 12/090,134, filed as application No. PCT/EP2006/067271 on Oct. 11, 2006, now Pat. No. 8,948,699.

(30) Foreign Application Priority Data

Oct. 14, 2005 (EP) .................................... 05022435

(51) Int. Cl.
*H04B 1/00* (2006.01)
*H04B 15/00* (2006.01)
(Continued)

(52) U.S. Cl.
CPC ........... *H04W 72/082* (2013.01); *H04B 1/7103* (2013.01); *H04B 1/7105* (2013.01); *H04B 2201/70711* (2013.01); *H04Q 2213/13098* (2013.01)

(58) Field of Classification Search
CPC ............... H04B 1/7103; H04B 1/7105; H04B 2201/70711; H04Q 2213/13098; H04W 72/082
USPC ....................... 455/63.1, 452.1, 561
See application file for complete search history.

(56) References Cited

U.S. PATENT DOCUMENTS 6,594,495 B2 * 7/2003 Salonaho .............. H04W 28/18
455/226.3
6,856,643 B1 2/2005 Yang et al.
(Continued)

FOREIGN PATENT DOCUMENTS

| EP | 1 178 621 A | 2/2002 |
|---|---|---|
| JP | 2005-109624 A | 4/2005 |
| WO | WO 2004/070958 A | 8/2004 |

OTHER PUBLICATIONS

Seskar, I. et al. Software-Defined Radio Architectures for Interference Cancellation in DS-CDMA Systems. *Personal Communications, IEEE* vol. 6, No. 4, pp. 26-34, Aug. 1999. doi: 10.1109,198.788212.

(Continued)

*Primary Examiner* — Ayodeji Ayotunde (57) ABSTRACT

In a method of interference mitigation in a multi user detection capable radio base station in a communication system, which radio base station comprises a set of confined detection modules, at least one of which is capable of handling multiple user connections, first and at least a second subset of detection modules are formed from said set, wherein the second set comprises at least one interference mitigation capable detection module. Interference information from the first subset is communicated to the second subset, interference originating in user connections of the first subset are then mitigated from the user connections of the second subset. Subsequently, interference is mutually mitigated between the connections within the interference mitigation capable detection module.

10 Claims, 4 Drawing Sheets

(51) Int. Cl.
*H04W 72/08* (2009.01)
*H04B 1/7103* (2011.01)
*H04B 1/38* (2015.01)
*H04M 1/00* (2006.01)
*H04B 1/7105* (2011.01)

(56) References Cited

U.S. PATENT DOCUMENTS

| | | | |
|---|---|---|---|
| 6,982,968 | B1 | 1/2006 | Barratt et al. |
| 7,092,440 | B1 | 8/2006 | Dress et al. |
| 7,212,579 | B2 | 5/2007 | Claussen et al. |
| 2002/0196841 | A1* | 12/2002 | Karna ............... H04B 1/71075 375/147 |
| 2003/0048800 | A1* | 3/2003 | Kilfoyle ............... H04B 1/7103 370/441 |
| 2003/0108091 | A1 | 6/2003 | Nishio et al. |
| 2003/0198303 | A1 | 10/2003 | Taylor et al. |
| 2004/0001429 | A1 | 1/2004 | Ma et al. |
| 2004/0213328 | A1 | 10/2004 | Mills et al. |
| 2004/0213360 | A1 | 10/2004 | McElwain |
| 2004/0223537 | A1 | 11/2004 | Abdi et al. |
| 2006/0135081 | A1 | 6/2006 | Mysore et al. |
| 2006/0258316 | A1 | 11/2006 | Lei et al. |
| 2007/0010281 | A1* | 1/2007 | Sebire ................... H04L 67/325 455/525 |

OTHER PUBLICATIONS

Seskar, et al. A Software Radio Architecture for Linear Multiuser Detection, IEEE Journal on Selected Areas in Communications, IEEE Service Center, Piscataway, U.S, vol. 17, No. 5, May 1999.

Seskar, I. et al. Reconfigurable testbed for interference cancellation in OS-COMA systems. IEEE Journal of Wireless Information Networks Plenum, USA, vol. 6, No. 1, Jan. 1999, pp. 37-47.

* cited by examiner

METHOD AND ARRANGEMENT FOR INTERFERENCE MITIGATION

RELATED APPLICATIONS

This application is a divisional of co-pending U.S. patent application Ser. No. 12/090,134 filed Nov. 11, 2008 which is a 371 of International Application No. PCT/EP2006/067271, filed Oct. 11, 2006, which claims benefit of European Application No. 05022435.1, filed Oct. 14, 2005, the disclosures of which are fully incorporated herein by reference.

TECHNICAL FIELD

The present invention relates to telecommunication system in general, specifically to methods and arrangements enabling interference mitigation in such systems.

BACKGROUND

Current trends in radio base station development strive towards a modular design, e.g. the base station comprises a plurality of separate modules in which various functionalities are implemented. Consequently, upgrades and expansions of the system can be provided by simply inserting or replacing a module in the base station. However, for a number of specific functionalities this method of design results in an increased complexity and unnecessary signaling between the modules. One such functionality is so called Multi User Detection (MUD) taking the other users into consideration jointly. A base station with MUD is capable of receiving and detecting multiple users at the same time (serial or parallel). When this detection process is divided between several detection modules, problems arise. In order to be able to effectively implement interference mitigating functionalities such as so called Interference Cancellation (IC) between users in such systems, the various separate modules need to be able to take interference caused by signals originating from users assigned to other modules into consideration. Consequently, the modules need to exchange information about their respective user connections, which increases the complexity and the cost of implementation.

An informative article "Software Radio Architectures for Interference Cancellation in DS-CDMA Systems" (by I. Seskar, N. B. Mandayam, IEEE Personal Communications, August 1999) discloses a reconfigurable architecture for linear multiuser detection. The architecture enables a dynamic receiver which can be reconfigured into a plurality of different receiver structures, e.g. matched filter (MF), successive interference canceller (SIC), approximate decorrelator (AD), exact decorrelator (DC), and minimum squared error detector (MMSE).

SUMMARY

An object of the present invention is to provide a radio base station with improved information exchange between detection modules.

Another object is to provide improved allocation of users to the different detection modules of a radio base station.

A further object is to provide interference mitigation in modularly designed radio base stations.

A further object is to provide implementionally tractable and efficient interference cancellation in a radio base station with multiple detection modules and multiple users.

This object is achieved in accordance with the attached claims.

Briefly, the present invention includes arranging the detection modules of a radio base station into at least two subsets. Information concerning the interference of user connections or set of user connections of one of the subsets are signaled to the second subset, where it is utilized to mitigate interference from the input signals of the detection modules of the second subset.

Further, the invention also concerns allocating users based on e.g. service to the above arranged detection modules to optimize the interference cancellation while minimizing the information exchange.

Advantages of the present invention comprise:
flexibility
improved implementation of IC and/or other interference mitigating capable receivers and detectors.

BRIEF DESCRIPTION OF THE DRAWINGS

The invention, together with further objects and advantages thereof, may best be understood by making reference to the following description taken together with the accompanying drawings, in which.

ABBREVIATIONS

WCDMA Wideband Code Division Multiple Access
CDMA Code Division Multiple Access
OFDM Orthogonal Frequency Division Multiplex
TDMA Time Division Multiple Access
MUD Multi User Detection
IC Interference Cancellation
E-DPCCH Enhanced Dedicated Physical Control CHannel
E-DPDCH Enhanced Dedicated Physical Data CHannel
SIR Signal to Interference Ratio

DETAILED DESCRIPTION

The present invention will be described in the context of a WCDMA system, but is equally applicable to other telecommunication systems requiring interference mitigation. In essence, the present invention is with only minor modifications applicable in any one of CDMA, WCDMA, CDMA2000, OFDM or TDMA. Other applicable systems comprise FDD- and TDD-systems Consequently, the term radio base station can be exchanged for the more general term base station or the more specific term base transceiver station.

The first commercial releases of Code Division Multiple Access (CDMA) systems typically feature correlation receivers with the RAKE principle to utilize the relevant signal energy in the received signal. However, a multi-user detector (MUD) is also applicable, since information is available about the signals related to all connections with a radio link at the base station. An optimal multi-user detector produces the most probable data sequences from all connections, essentially eliminating the inter-connection interference. In practical implementations, this is not attractive considering the expected implementation complexity caused by the modular design.

Instead, at present suboptimal interference mitigation algorithms are adopted, e.g. iterative schemes such as Parallel Interference Cancellation (PIC) and Successive Interference Cancellation (SIC). In essence, the iterative process for each connection toggles between subtracting interference from other connections and decoding the signal, and reproducing the received signal component so that it can be subtracted while decoding other connections.

For efficiency reasons, as stated before, the base station signal processing for handling connections may be separated into several confined processing units. This means that extensive information representing regenerated signals or equivalent for each user connection has to be communicated between the different confined processing units.

Therefore, there is a need for MUD and IC in modularly designed radio base stations, while at the same time maintaining the information exchange at a desired design level.

Basically, the invention is directed towards mitigating interference in telecommunication systems e.g. WCDMA. Interference mitigation comprises any type of interference cancellation, e.g. serial or parallel or other, multi user detection, maximum likelihood detection, maximum MUD a posteriori etc., in short, any method of taking the interference from other users into account in order to improve signal quality for a specific user.

Interference mitigation e.g. interference cancellation or MUD provides extensive theoretical efficiency gains in a wireless cellular network as WCDMA. However, as stated earlier, the actual gains are in practice restricted by the software (SW) and hardware (HW) co-design. Consequently, it is at present likely that the design of future base stations will be based on several confined units or detection modules with limited or no inter-communication that can be used for interference cancellation of users allocated to different modules.

For a particular case e.g. 3GPP, the uplink configuration features separate physical control and data dedicated channels i.e. Dedicated Physical Control CHannel (DPCCH) and Dedicated Physical Data CHannel (DPDCH). The DPCCH and/or Enhanced-DPCCH (E-DPCCH) are always transmitted and power controlled to maintain a received signal to interference ratio (SIR). To support discontinuous transmission, the (E-)DPDCH power is determined as a data rate dependent offset i.e. beta-factor to the (E-)DPCCH power. This offset is either specified for each uplink dedicated channel transport format combination, or only the highest data rate transport format combination offset is specified, and the mobile computes offsets for other transport format combinations accordingly. Inner loop power control assures a (E-) DPCCH SIR quality relative a SIR target. The SIR target is adjusted based on perceived (E-)DPDCH quality in the outer loop power control. This means that the perceived (E-)DPDCH quality will be maintained in the long run, whereas the perceived (E-)DPCCH quality depend on the offset i.e. beta-factor.

Since interference cancellation/mitigation and/or multi user detection typically does not have an impact on estimated DPCCH SIR, but does on DPDCH quality after cancellation on which outer loop power control is based, it is important that the offset reflects expected cancellation efficiency. If an algorithm jointly optimizing IC and MUD for both DPDXH and DPCCH and/or channel estimation is implemented, it consequently may take the DPCCH SIR into account or at least partially into account.

The present invention enables performing effective and efficient optimal/sub-optimal interference cancellation or mitigation and/or multi-user detection in a cost and complexity efficient manner.

Basically, the solutions according to the invention are based on optimizing the efficiency of the interference cancellation/mitigation and/or multi-user detection via optimizing the strategies and algorithms for allocation of connections to the different confined processing units (HW boards). This can be viewed from two different angles. Either, the architecture is designed to enable interference cancellation or mitigation, with subsequent user allocation to the modules. Or, the user allocation is determined first, and the architecture and implementation of interference cancellation or mitigation is determined based on the user allocation.

The methods and arrangements according to the invention will be described in the context of, but are not limited to, a modularly based radio base station in a communication system e.g. WCDMA. The methods and arrangements are equally applicable to systems utilizing OFDMA or TDMA. The radio base station typically comprises a plurality of separate or confined detection modules, of which at least one is adapted to handle multiple user connections. It is off course possible and very probable that the different detection modules are adapted to handle different number of user connections depending on their traffic demands and services supported. Further, the radio base station can be configured with different modules, different HW capabilities and different detection schemes.

Figure 1:
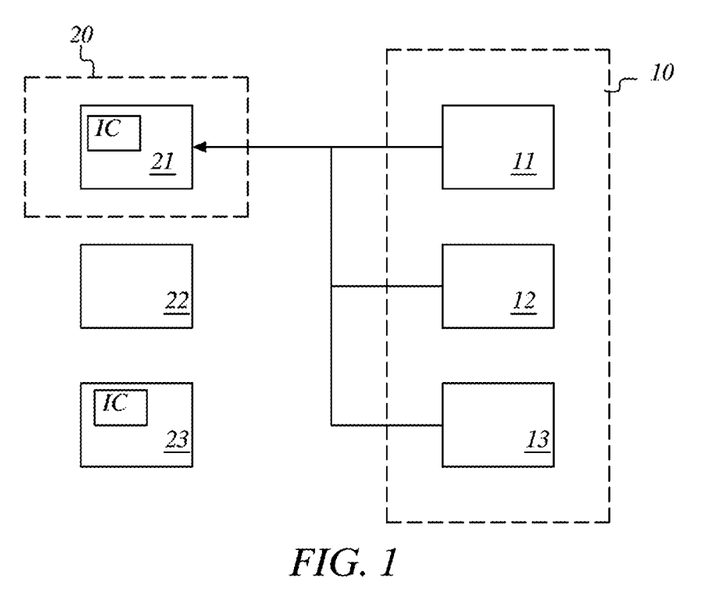
FIG. 1 is schematic of a basic embodiment of a method of the invention.

With reference to FIG. 1, according to a basic embodiment of a method of the invention, at least two subsets 10, 20 of detection modules are formed within the total set of detection modules 11, 12, 13, 21, 22, 23. The two subsets 10, 20 are then connected to each other so as to enable interference information to be communicated from the first subset 10 to the at least second subset 20. It is implied that there can be more than two subsets and that the subsets can be overlapping.

It should be noted that the subsets 10, 20 are preferably adapted to only allow information to be communicated in one direction, in some sense but not limited to a one way interface or gate.

The second subset 20, according to the foregoing embodiment, comprises at least one interference cancellation or mitigation capable detection module 21, in which interference can be cancelled or mitigated (or subset MUD, i.e. optimum decoding of all users within a confined detection module) between the user connections of that detection module. In addition, the detection module 21 can utilize the communicated information from the first subset 10 to eliminate or mitigate interference originating from user connections of detection modules of the first subset 10.

The interference information can, according to a specific embodiment, comprise representations of regenerated signals originating from at least one user connection in one detection module.

Figure 2:
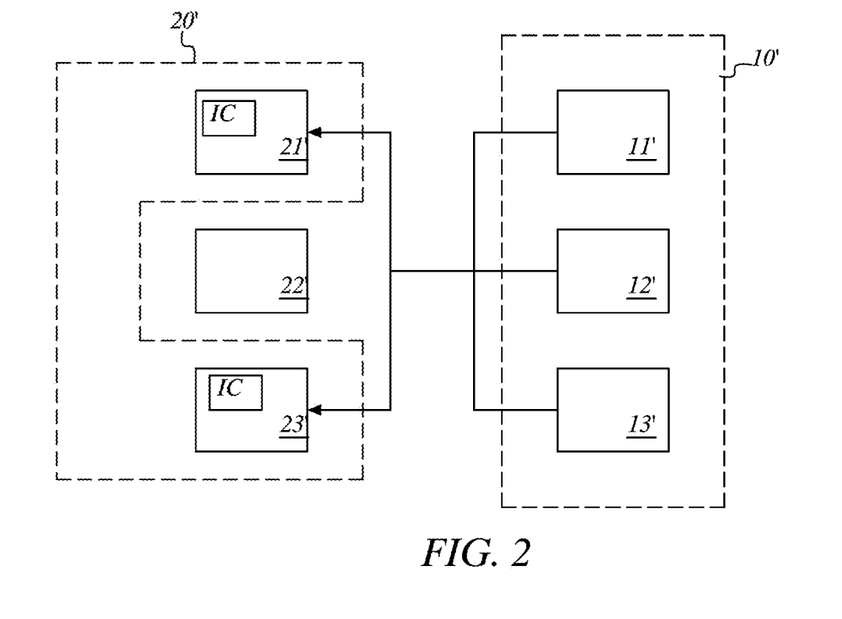
FIG. 2 is a schematic of another embodiment of the invention.
Figure 3:
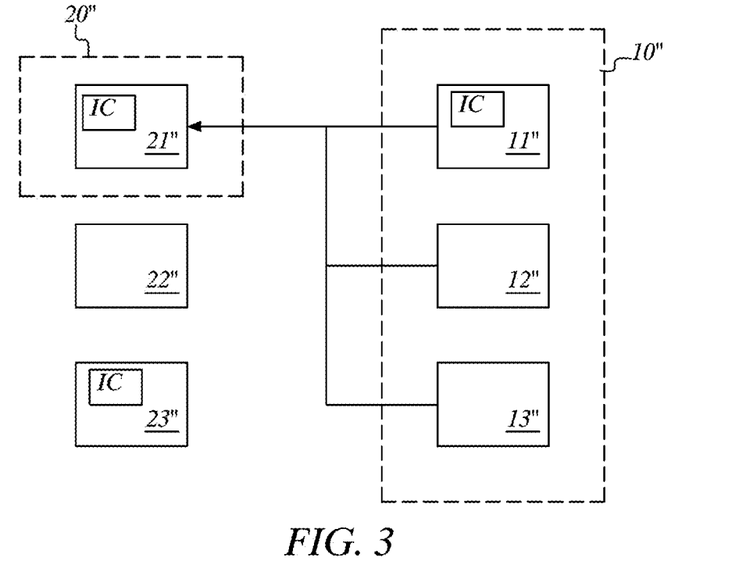
FIG. 3 is a schematic of another embodiment of the invention.

Again with reference to FIG. 1, according to the basic embodiment the second subset 20 comprises only one detection module, namely the interference cancellation or mitigation capable one 21. However, it is equally possible for the second subset 20 to comprise multiple detection modules, especially multiple interference cancellation or mitigation capable detection modules 21', 23', as is indicated in FIG. 2. Correspondingly, it is similarly possible for the first subset 10 to comprise only one detection module, interference cancellation or mitigation capable or not. Or the first subset 10" can comprise a plurality of detection modules 11", 12", 13", as illustrated in FIG. 3.

According to a specific embodiment, the step of communicating interference information comprises the further step of selecting a set of user connections from one or several detection modules in the first subset and communicating the interference information concerning the selected connections to the first subset. The selection could be performed in order to select users which have a large impact on the total uplink load, or which have a high priority, or by some other criteria.

In addition, it is equally possible that some of the detection modules are not adapted to receive or communicate any interference information to other detection modules, they are truly confined. Consequently, the radio base station would comprise at least two subsets of detection modules, and a plurality of non-interconnected detection modules, and possibly a plurality of detection modules that are fully interconnected.

The important aspect of the above described embodiments is that the detection modules are selectively connected to each other, in strong contrast to the situation where all detection modules are exchanging all interference information regardless if it is necessary or not.

According to the invention, the subsets can be configured in a plurality of ways, namely: a subset can be configured to communicate interference information to all other detection modules, a subset can be configured to receive interference information from one subset and forward that information as well as its own to another subset e.g. a sequential communication, finally the subsets can be configured to only communicate its interference information to one or more specific subsets. It is evident that the detection modules of a radio base station can be configured in any combination of the above described configurations. Consequently, a radio base station can comprise a mix of non-interconnected detection modules, fully interconnected detection modules, subset-interconnected detection modules and so on. In addition, the radio base station according to the invention can be configured to utilize any number of different interference mitigating methods in combination with the method as defined by the present invention. Finally, a radio base station according to the invention can be configured as comprising any mix of interference cancellation or mitigation capable or MUD capable detection modules.

Subsequently, it is necessary to allocate users to the various detection modules in an optimal and/or efficient manner.

According to a specific embodiment, the user connections are allocated to the various confined detection modules based on service.

According to another specific embodiment, users with the same service are allocated to the same confined unit or units.

As an example, all users of E-DCH (E-DPCCH and E-DPDCH) are allocated to a detection module with internal interference cancellation or mitigation. Consequently, it is required to configure suitable beta-factors for the respective connections to provide capacity for a high load scenario. Examples of how to configure suitable beta factor will be discussed later in relation to a few specific example embodiments.

According to yet another specific embodiment, all soft handover users are allocated to detection modules with internal interference cancellation or mitigation to ensure optimal coverage.

Alternatively, according to yet another embodiment, the allocation of user connections to the confined units is mixed to even the load of the processors, and maintain a constant fraction between cancelled or mitigated and not cancelled or mitigated interference. This means that a universal offset parameter or beta factor setting can be used.

Other embodiments comprise allocating severely interfering users to a detection module with internal interference cancellation or mitigation, allocating users with high priority to said detection module.

In a specific example, a confined unit detecting E-DCH users, which are cancelled or mitigated within the unit, and these signals are regenerated and cancelled and/or mitigated at other confined units.

Interference Cancellation or mitigation is implemented within confined units, and signals corresponding to selected connections from each confined unit are regenerated and cancelled from the input to the other confined units.

To ensure good coverage—allocate soft handover users to confined units with interference cancellation.

A set of DPDCH or E-DPDCH offset parameters can be pre-determined that corresponds to specific confined unit user allocations. Allocations and re-allocations may strive towards configurations corresponding to a plausible parameter setting. In this way, each offset parameter setting corresponds to a preferable working condition.

Everything that is described for initial allocation, also applies to systems where re-allocations are plausible.

Everything that is described for allocations that relate to a certain offset parameter setting, also applies to systems where the allocation changes and the offset parameters are changed accordingly.

EXAMPLES

E-DCH Interference Cancellation within a Confined Unit

In a setting where it is desirable to promote E-DCH, it is relevant to at least mutually cancel or mitigate E-DCH interference between E-DCH connections. Therefore, E-DCH's should be allocated to a confined detection module with mutual interference canceling or mitigation (possibly the only interference canceling or mitigation-capable confined unit). The challenge is then to configure suitable beta-factors.

Without IC, E-DPCCH should have an $E_c/I_o$ of at least $\gamma_0$. Assume that a E-DPDCH $E_c/I_o$ of $\Delta \cdot \gamma_0$ is sufficient for the E-DPDCH max rate. Then the beta-factors $\beta_d^2/\beta_c^2 = \Delta$. See FIG. 6 for illustration.

Figure 6:
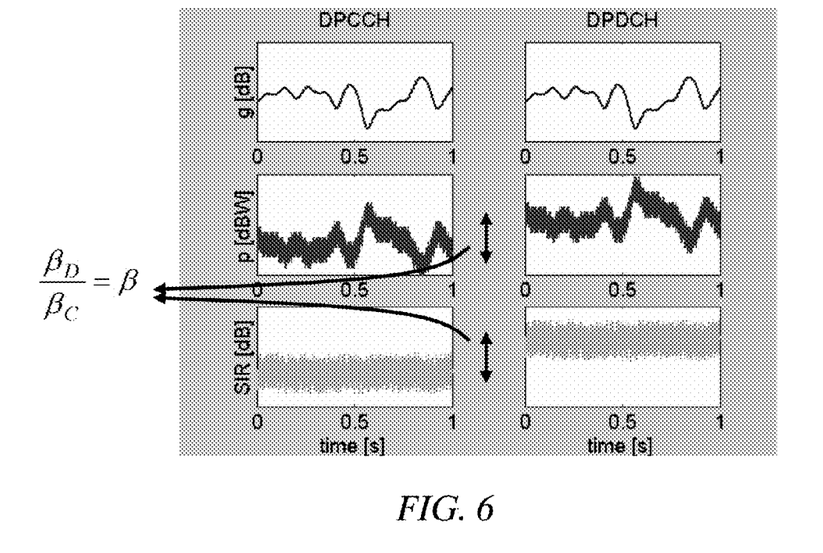
FIG. 6 illustrates an example according to the invention.

In case of interference cancellation in the confined unit, assume that there is a limit of to what extent E-DCH may dominate the base station uplink interference, i.e. the max E-DCH contribution $I_E = A\ I_{tot}$, is related to the total uplink interference. Furthermore, assume that the residual interference factor, RIF (i.e. the fraction of the interference that the IC cannot cancel, denoted $\epsilon$) in this loaded situation is known or estimated. Therefore, the E-DPDCH requirement can be rewritten as:

$$\Delta\gamma_0 = \frac{\beta_d^2/\beta_c^2 p_C}{I_{tot} - (1-\varepsilon)I_E} = \frac{\beta_d^2/\beta_c^2 p_C}{I_{tot}[1 - A(1-\varepsilon)]} = \frac{\beta_d^2/\beta_c^2 \gamma_0}{[1 - A(1-\varepsilon)]}$$

where $p_c$ is the received signal power of DPCCH. This means that the beta-factors should be configured as:

$$\beta_d^2/\beta_c^2 = \Delta[1-A(1-\epsilon)].$$

This means that the beta factor ratio in this case is a function of the load reserved for E-DCH, and the expected interference cancellation performance. Allocating a larger portion of the uplink resources (larger A) will require smaller beta factor ratio and vice versa. Similarly, a better cancellation performance (lower ε) also requires smaller beta factor ratio and vice versa. For lower load cases, this will give a higher than necessary DPCCH, but this is at no critical cost, since the load is low anyway. The higher the load the more accurate the DPCCH level.

In general, this means that a recommended configuration strategy is to allocate E-DCH users to a confined unit with mutual canceling or mitigation and to configure the beta-factors to meet the high load case.

Moreover, it can be motivated to update the beta factor configuration depending on whether the cell is capable of canceling interference or not. This means that the configuration needs to be updated due to mobility. For example, a present user performs handover and leaves the radio base station, another user performs handover and leaves the radio base station, a user performs handover and connects to the radio base station etc.

E-DCH Interference Cancellation within Two Isolated Confined Units

In this case, interference is cancelled within each unit, but no signaling takes place between the units. Also, this scenario could be related to pre-computed beta-factors, especially if the two are allocated users to even the load between the units.

Adaptive Uplink Configuration Based on Confined Unit Allocation

Even if frequent link (re-)configuration is too costly to be motivated in the current 3GPP standard of RRC signaling, future evolvements and/or future systems might feature the possibility to more often update the correspondence to DPDCH-DPCCH offset. Then, the confined unit allocation should trigger updates of the uplink configuration.

The configuration of beta factors and allocation of power could be performed in a plurality of different manners. Considering a specific service configuration, the beta factors can, according to a specific embodiment, be configured as a function of the resource allocation to such services and an expected interference mitigation or cancellation performance. Consequently, more or less power can be allocated in comparison to a reference configuration to the physical data relative control channels when the resource allocation portion is decreased or increased compared to the reference configuration. Similarly, more or less power can be allocated when the interference cancellation performance is worse or better than the reference configuration.

Figure 4:
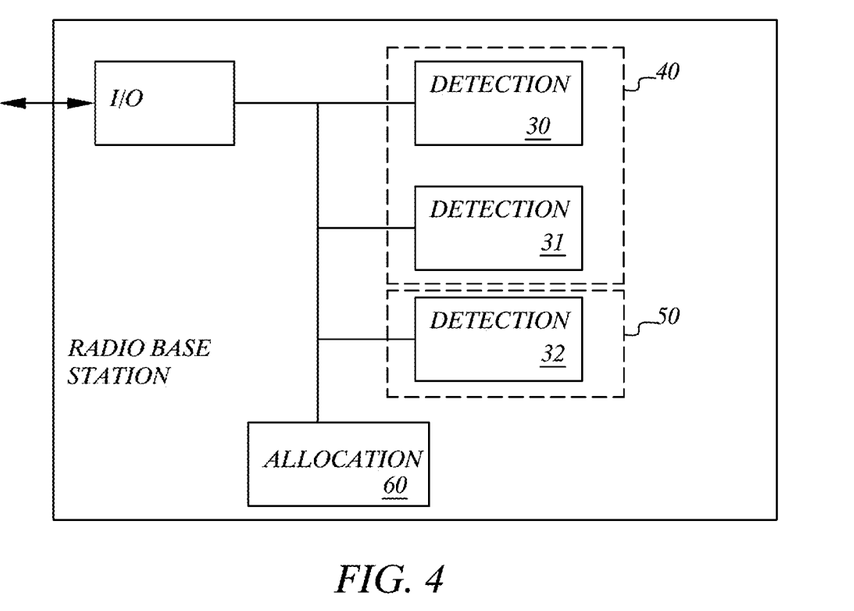
FIG. 4 is a schematic of a basic embodiment of a radio base station according to the invention.
Figure 5:
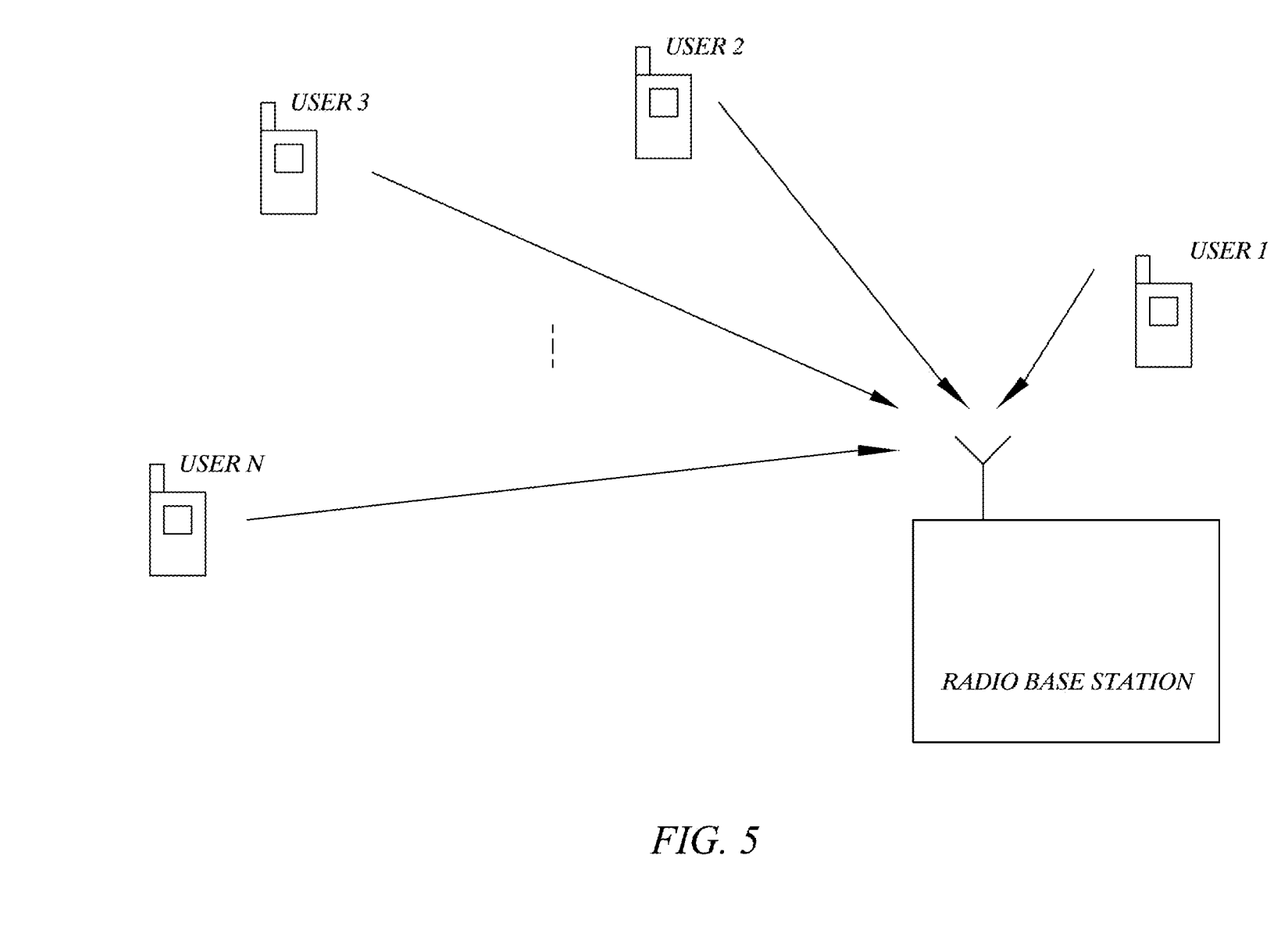
FIG. 5 is an overview of a system in which the invention is utilized.

A base station according to the invention, suitable for the interference mitigation and allocation previously described will be described below with reference to FIG. 4 and FIG. 5.

Accordingly, a radio base station is required, that is configured to handle the above mentioned method and embodiments and/or combinations of embodiments and/or features of embodiments thereof.

Basically, the radio base station RBS according to the invention comprises an input/output unit I/O, a plurality of detection modules 30, 31, 32 which are arranged into at least two subsets 40, 50 of detection modules. The first subset 40 comprises a plurality of detection modules 30, 31. The second subset 50 comprises at least one interference cancellation or mitigation capable detection module 32. The two subsets 40, 50 are connected to each other in such a manner as to enable the detection modules of the first subset 40 to communicate interference information regarding their respective connections to the second subset 50. Thereby, the interference cancellation or mitigation capable detection module of the second subset 50 is arranged to cancel interference originating in user connections of the first subset 40.

As stated earlier, the interference cancellation or mitigation capable detection modules are arranged to mutually cancel interference between its connections and in addition to cancel interference from other connections based on interference information received via the one way interface.

In addition, the radio base station comprises at least one allocating unit 60 for allocating users to the various detection modules. Alternatively, the allocation unit 60 is adapted to receive allocation information from some other system node i.e. radio network controller or a controlling processing unit in the radio base station. Or the allocation unit 60 itself determines how to allocate users. Another alternative is that there is a predefined allocation schedule in the radio base station.

Figure 7:
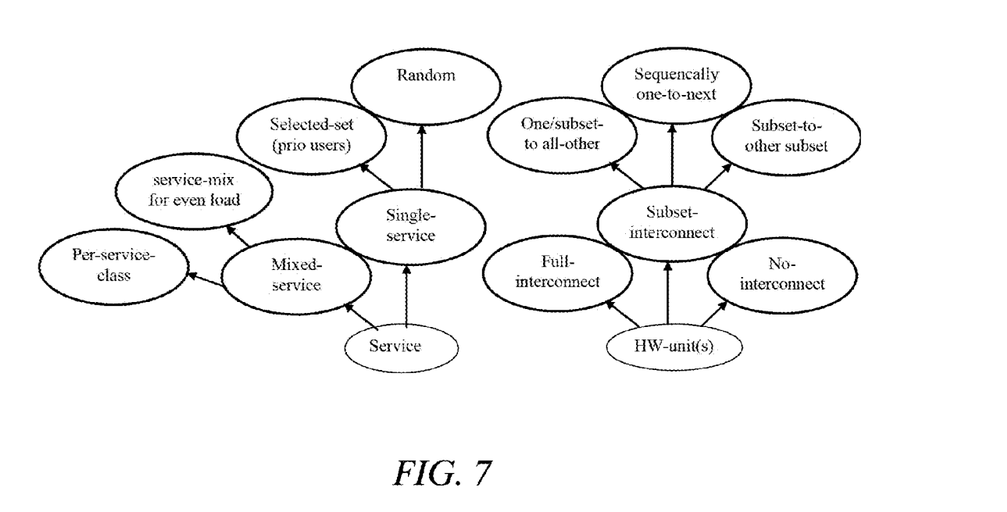
FIG. 7 is an overview of the various aspects of the invention.

With reference to FIG. 7, the methods and arrangements according to the various embodiments of the invention can be combined and utilized in any order. In other words, arrangement of the connections between the detection modules can be based on the required user allocation and/or the required interference mitigation method. Alternatively, the interference mitigation and the user allocation can be performed based on the existing arrangement of connections between the detection modules. Alternatively, the methods can be performed adaptively based on the current load in the system. The common concept is that the arrangement of the connections between the modules, the allocation of user connection to the different detection modules, and the implementation of interference cancellation are configured together to optimize the operation of the base station. The order in which the steps are performed is of subordinate importance.

All the above described embodiments concerning allocation can also be applied to re-allocation scenarios.

The methods and arrangements of the present invention can be implemented using hardware design or software design or combinations thereof.

Advantages of the present invention comprise:
flexibility
improved interference cancellation or mitigation or MUD capable receivers or detectors.

It will be understood by those skilled in the art that various modifications and changes may be made to the present invention without departure from the scope thereof, which is defined by the appended claims.

The invention claimed is:

1. A method of interference mitigation in a multi user detection capable radio base station in a communication system, said radio base station being modularly arranged and comprising a set of confined detection modules, at least one of which is capable of handling multiple user connections, comprising:

allocating user connections to the set of detection modules based on service;

forming a first subset of detection modules within said radio base station from said set;

forming at least a second subset of detection modules within said radio base station from said set, said second set comprising at least one interference mitigation capable detection module;

wherein each of the confined detection modules has one or more distinct user connections assigned to it;

communicating interference information concerning the respective user connections of said first subset from said first subset to said second subset;

mitigating interference originating in said user connections of said first subset from the user connections of said second subset; and mutually mitigating interference between the connections or a subset of connections within said at least one interference cancellation capable detection module.

2. The method according to claim 1, further comprising allocating soft handover users to an interference mitigation capable detection module of said second subset to ensure good coverage.

3. The method according to claim 1, further comprising allocating users with the same service to the same detection module.

4. The method according to claim 1, further comprising allocating users with the same service to different detection modules to even the load of the detection modules.

5. The method according to claim 1, further comprising allocating all EDCH user connections to an interference mitigation capable detection module.

6. The method according to claim 5, further comprising configuring beta-factors for the respective connections to provide capacity for high load cases, said beta-factors constituting a data rate dependent power offset of an EDCH channel.

7. A modularly arranged radio base station comprising a set of confined detection modules, at least one of which is capable of handling multiple user connections, comprising:
a processor adapted to allocate user connections to the respective detection modules;
a first subset of detection modules;
at least a second subset of detection modules comprising at least one interference mitigation capable detection module; and
wherein each of the confined detection modules has one or more distinct user connections assigned to it;
said first subset of detection modules is adapted to signal interference information concerning its respective user connections to said second subset, and
said at least one interference mitigation capable detection module is adapted to mitigate interference originating in user connections of said first subset from the user connections of said second subset; and
said at least one interference mitigation capable detection module is adapted to mutually mitigate interference between the connections or a subset of connections within said at least one interference mitigation capable detection module.

8. The radio base station according to claim 7, wherein said processor is configured to allocate user connections based on their service.

9. The radio base station according to claim 7, wherein said processor is configured to allocate users with the same service to the same detection module.

10. The radio base station according to claim 7, wherein said processor is configured to allocate users with the same service to different detection modules to even the load on the detection modules.

* * * * *